US012621556B2

(12) United States Patent (10) Patent No.: US 12,621,556 B2
Wang (45) Date of Patent: May 5, 2026

(54) IMAGE PROCESSING METHOD AND APPARATUS, AND ELECTRONIC DEVICE

(71) Applicant: VIVO MOBILE COMMUNICATION CO., LTD., Dongguan (CN)

(72) Inventor: Yiting Wang, Hangzhou (CN)

(73) Assignee: VIVO MOBILE COMMUNICATION CO., LTD., Dongguan (CN)

( * ) Notice: Subject to any disclaimer, the term of this patent is extended or adjusted under 35 U.S.C. 154(b) by 85 days.

(21) Appl. No.: 18/586,166

(22) Filed: Feb. 23, 2024

(65) Prior Publication Data

US 2024/0196082 A1 Jun. 13, 2024

Related U.S. Application Data

(63) Continuation of application No. PCT/CN2022/114534, filed on Aug. 24, 2022.

(30) Foreign Application Priority Data

Aug. 25, 2021 (CN) .......................... 202110984655.7

(51) Int. Cl.
| | |
|---|---|
| *H04N 23/62* | (2023.01) |
| *H04N 23/61* | (2023.01) |
| *H04N 23/63* | (2023.01) |
| H04N 23/667 | (2023.01) |

(52) U.S. Cl.
CPC ............. *H04N 23/62* (2023.01); *H04N 23/61* (2023.01); *H04N 23/632* (2023.01); *H04N 23/667* (2023.01)

(58) Field of Classification Search
CPC ........ H04N 23/60; H04N 23/61; H04N 23/62; H04N 23/632; H04N 23/667
See application file for complete search history.

(56) References Cited

U.S. PATENT DOCUMENTS

| | | | | |
|---|---|---|---|---|
| 10,542,204 | B2 * | 1/2020 | Pettersson | ........... G06F 3/04847 |
| 2003/0007078 | A1 * | 1/2003 | Feldis, III | .......... H04N 1/00127 |
| | | | | 386/E5.072 |
| 2017/0041527 | A1 * | 2/2017 | Pettersson | ............ H04N 23/743 |
| 2020/0059597 | A1 * | 2/2020 | Chen | ...................... H04N 23/64 |
| 2021/0014413 | A1 * | 1/2021 | Yang | ...................... H04N 5/265 |

FOREIGN PATENT DOCUMENTS

| | | | | |
|---|---|---|---|---|
| CN | 107820019 A | 3/2018 | | |
| CN | 107948530 A | 4/2018 | | |
| CN | 110022396 A | * 7/2019 | ............. | H04N 23/80 |
| CN | 110996012 A | 4/2020 | | |
| CN | 111104533 A | 5/2020 | | |
| CN | 111182223 A | 5/2020 | | |
| CN | 111953903 A | 11/2020 | | |
| CN | 113794834 A | 12/2021 | | |
| WO | 2008050674 A1 | 5/2008 | | |

* cited by examiner

*Primary Examiner* — Antoinette T Spinks
(74) *Attorney, Agent, or Firm* — The Webb Law Firm

(57) ABSTRACT

An image processing method includes receiving a photographing input by a user; performing, in response to the photographing input, photographing through a first application, to obtain at least one first image, and saving a target image parameter into a second application; and performing image processing on the at least one first image based on the target image parameter through the second application. The target image parameter is an image processing parameter set by the user in the first application for the at least one first image.

17 Claims, 9 Drawing Sheets

An electronic device receives a photographing input by a user ⟋ 201

The electronic device performs, in response to the photographing input, photographing through a first application, to obtain at least one first image, and saves a target image parameter into a second application ⟋ 202

The electronic device performs image processing on the at least one first image based on the target image parameter through the second application ⟋ 203

IMAGE PROCESSING METHOD AND APPARATUS, AND ELECTRONIC DEVICE

CROSS-REFERENCE TO RELATED APPLICATIONS

This application is a Bypass Continuation Application of International Patent Application No. PCT/CN2022/114534 filed Aug. 24, 2022, and claims priority to Chinese Patent Application No. 202110984655.7 filed Aug. 25, 2021, the disclosures of which are hereby incorporated by reference in their entireties.

BACKGROUND OF THE INVENTION

Field of the Invention

This application relates to the field of communication technologies, and specifically, to an image processing method and apparatus, and an electronic device.

Description of Related Art

Generally, when using an electronic device for photographing, a user may obtain a plurality of photos in a continuous photographing manner, and then manually optimize the plurality of photos to obtain a plurality of photos of consecutive moments with processing effects.

However, when the foregoing manner is used for photographing, the electronic device does not perform any processing on the image during photographing, so that an effect of the final photo is poor, resulting in poor efficiency of the electronic device in photographing images.

SUMMARY OF THE INVENTION

The embodiments of this application provide an image processing method and apparatus, and an electronic device.

According to a first aspect, an embodiment of this application provides an image processing method. The image processing method includes: receiving a photographing input by a user; performing, in response to the photographing input, photographing through a first application, to obtain at least one first image, and saving a target image parameter into a second application; and performing image processing on the at least one first image based on the target image parameter through the second application, where the target image parameter is an image processing parameter set by the user in the first application for the at least one first image.

According to a second aspect, an embodiment of this application provides an image processing apparatus, where the image processing apparatus includes: a receiving module, a photographing module, a saving module, and a processing module. The receiving module is configured to receive a photographing input by a user; the photographing module is configured to perform, in response to the photographing input received by the receiving module, photographing through a first application, to obtain at least one first image; the saving module is configured to save a target image parameter into a second application, where the target image parameter is an image processing parameter set by the user in the first application for the at least one first image; and the processing module is configured to perform, through the second application based on the target image parameter saved by the saving module, image processing on the at least one first image obtained by the photographing module.

According to a third aspect, an embodiment of this application provides an electronic device. The electronic device includes a processor, a memory, and a program or instructions stored in the memory and executable on the processor, the program or the instructions, when executed by the processor, implementing steps of the method according to the first aspect.

According to a fourth aspect, an embodiment of this application provides a non-transitory readable storage medium, storing a program or instructions, the program or the instructions, when executed by a processor, implementing steps of the method according to the first aspect.

According to a fifth aspect, an embodiment of this application provides a chip. The chip includes a processor and a communication interface. The communication interface is coupled to the processor. The processor is configured to run a program or instructions to implement the method according to the first aspect.

DESCRIPTION OF THE INVENTION

Figure 1:
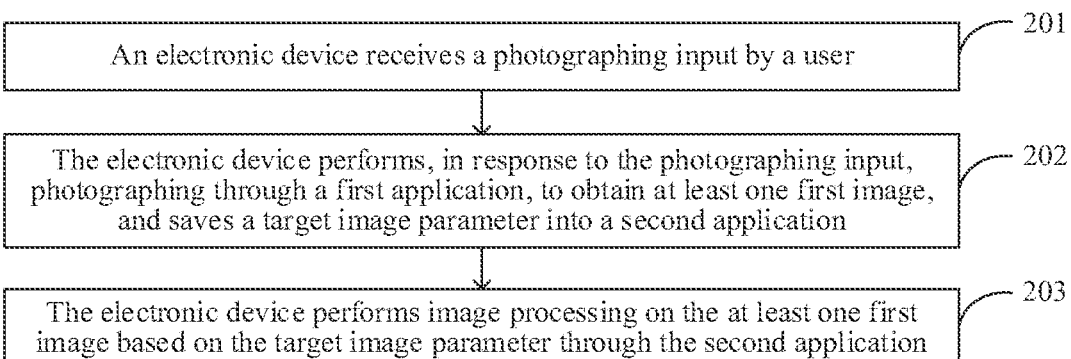
FIG. 1 is a flowchart of an image processing method according to an embodiment of this application.

The technical solutions in embodiments of this application are clearly described below with reference to the accompanying drawings in embodiments of this application. Apparently, the described embodiments are some rather than all of embodiments of this application. All other embodiments obtained by a person of ordinary skill in the art based on embodiments of this application fall within the protection scope of this application.

The specification and claims of this application, and terms "first" and "second" are used to distinguish similar objects, but are not used to describe a specific sequence or order. It is to be understood that the terms termed in this way is interchangeable in a proper case, so that embodiments of this application can be implemented in other orders than the orders illustrated or described herein. Moreover, the objects distinguished by "first" and "second" are usually of one type, and the quantity of objects is not limited. For example, there may be one or more first objects. In addition, "and/or" in the description and claims represents at least one of connected objects, and the character "/" generally indicates an "or" relationship between associated objects.

An image processing method provided in embodiments of this application is described in detail below with reference to the accompanying drawings by using some embodiments and application scenarios.

In a conventional solution, when using an electronic device for photographing, a user may quickly click a photograph button to acquire and process images, or may obtain a plurality of photos in a continuous photographing manner, and then manually optimize the plurality of photos to obtain a plurality of photos of consecutive moments with processing effects.

However, when photographing is performed by quickly clicking the photograph button, due to the fast clicking speed of the user and the time-consuming image processing process, the electronic device cannot respond to the camera function within a short period of time, resulting in the loss of a specific camera scene. When photographing is performed continuously, the electronic device does not perform any processing on the image during photographing, so that an effect of the final photo is poor, resulting in poor efficiency of the electronic device in photographing images.

To solve the technical problems existing in the conventional solution, in this embodiment of this application, when a photographing preview interface of a first application (for example, a camera application) is displayed, the user may preset a plurality of image processing parameters (namely, target image parameters in the following embodiments) in the first application. After receiving a photographing input by the user, the electronic device may perform photographing through the first application to obtain a plurality of images (namely, at least one first image in the following embodiments), and save a plurality of image processing parameters into a second application (for example, a gallery application). In this case, the electronic device may perform image processing on a plurality of images based on the image processing parameters through the second application, thereby obtaining a plurality of photos of consecutive moments with processing effects.

According to this solution, in one aspect, the electronic device can perform photographing through the first application to acquire a plurality of images, and perform image processing on the plurality of images through the second application instead of performing image processing during continuous photographing. This avoids the problem that the user clicks too fast and the image processing process is time-consuming, making the electronic device unable to respond to the camera function in a short period of time. In another aspect, the user performs the photographing input, to trigger the electronic device to acquire a plurality of images and automatically process the plurality of images by using preset image processing parameters, without subsequent operations of manually edit the images, thereby improving the efficiency of the electronic device in photographing images.

An embodiment of this application provides an image processing method. FIG. 1 shows a flowchart of an image processing method according to an embodiment of this application. The method may be applied to an electronic device. As shown in FIG. 1, the image processing method provided in this embodiment of this application may include the following steps 201 to 203.

Step 201: The electronic device receives a photographing input by a user.

In this embodiment of this application, when the user uses the electronic device to perform photographing, the electronic device may perform photographing through a first application (for example, a camera application) to obtain a plurality of images, and save image processing parameters (namely, target image processing parameters in the following embodiments) set by the user in the first application into a second application (for example, a gallery application). In this case, the electronic device can perform image processing on the plurality of images based on the image processing parameters through the second application to obtain a plurality of photos of consecutive moments with processing effects.

Optionally, in this embodiment of this application, the foregoing photographing input may be a sliding input, a long-press input, and the like by the user on a screen of the electronic device, or an input (for example, a click input, a double-click input, or a long-press input) by the user for a specific control (for example, a photographing control) in the first application, so that the electronic device acquires a plurality of images.

For example, the user may quickly click the "photograph button" a plurality of times, so that the electronic device acquires a plurality of images; or the user may set the continuous photographing mode in the first application and then click the "photograph button" so that the electronic device acquires a plurality of images.

Step 202: The electronic device performs, in response to the photographing input, photographing through a first application, to obtain at least one first image, and saves a target image parameter into a second application.

In this embodiment of this application, the target image parameter is an image processing parameter set by the user in the first application for the at least one first image.

Optionally, in this embodiment of this application, the first application may be a camera application or another application with a photographing function; and the second application may be a gallery application or another application with an image storage function.

It should be noted that photographing performed through the first application can be understood as continuous photographing performed through the first application. In some embodiments, the user quickly clicks the "photograph button" a plurality of times through the first application to perform continuous photographing; or the user sets the continuous photographing mode in the first application and then clicks the "photograph button to perform continuous photographing.

Optionally, in this embodiment of this application, each first image in the foregoing at least one first image may be exactly the same image or an image containing the same content.

Optionally, in this embodiment of this application, for each first image in the at least one first image, image parameters set by the user may be the same or different.

Optionally, in this embodiment of this application, the user may set only one set of image parameters for at least one first image, so that each first image corresponds to the same image parameter; or for each first image in the at least one first image, the user may set a set of image parameters respectively, so that different first images correspond to different image parameters.

Optionally, in this embodiment of this application, the electronic device may use a binder communication mechanism to save the target image parameter into a database of the second application, so that the electronic device performs image processing on the at least one first image based on the target image parameter through the second application.

It should be noted that the binder communication mechanism is an inter-process communication mechanism commonly used in electronic devices, implements data transmission based on a server/client architecture, and only needs one data copy in a transmission process, thereby having high performance.

Optionally, in this embodiment of this application, the electronic device may save the target image processing parameter into the second application after obtaining all images of the at least one first image; or each time the electronic device obtains a first image, an image parameter corresponding to the first image is saved into the second application, to save image parameters corresponding to all first images, that is, the target image parameters.

Step 203: The electronic device performs image processing on the at least one first image based on the target image parameter through the second application.

Optionally, in this embodiment of this application, in an implementation, the electronic device may use the same image parameters to perform image processing on the at least one first image, so that the at least one first image has the same processing effect. In another implementation, the electronic device may use different image parameters to perform image processing on the at least one first image respectively, so that different first images have different processing effects.

It can be understood that because the user only sets one set of image parameters for a plurality of images, after the electronic device receives the photographing input, the electronic device uses the image parameters for image processing for each of the plurality of images, thereby obtaining a plurality of photos of consecutive moments with the same processing effect. Alternatively, because the user may separately set a set of image parameters for each of the plurality of images, after receiving the photographing input, the electronic device may perform image processing on each image respectively by using the image parameter corresponding to each image, thereby obtaining a plurality of photos of consecutive moments with different processing effects.

Optionally, in this embodiment of this application, after the electronic device performs image processing on the at least one first image through the second application, the user may enter the second application to view the at least one first image obtained through image processing.

Figure 2A:
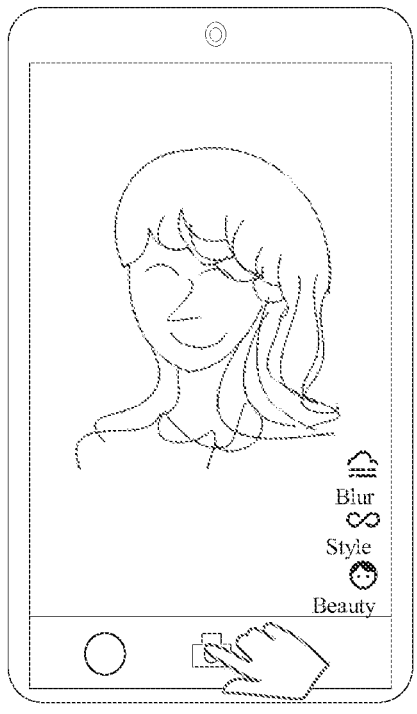
FIG. 2A is a schematic diagram 1 of an example of an interface of a mobile phone according to an embodiment of this application.
Figure 2B:
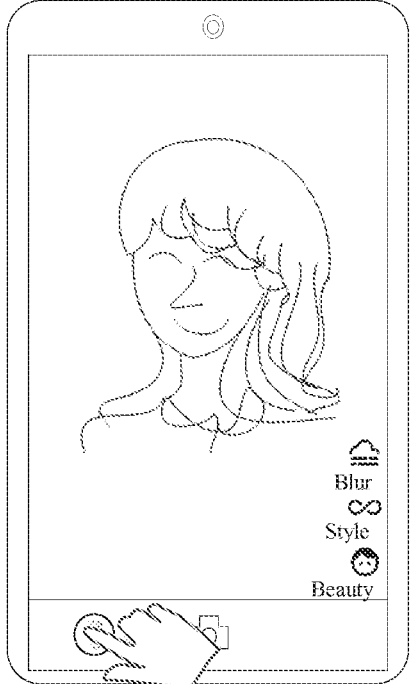
FIG. 2B is a schematic diagram 2 of an example of an interface of a mobile phone according to an embodiment of this application.

For example, as shown in FIG. 2A, the user may click the "photograph button", causing the electronic device to acquire a plurality of images through the camera application, and perform image processing on the plurality of images through the gallery application. As shown in FIG. 2B, the user may click a "Gallery Application Entry" to enter the gallery application and view a plurality of images obtained through image processing.

Optionally, in this embodiment of this application, after the user enters the second application, the electronic device may display all the first images obtained through image processing; or the electronic device can only display one first image obtained through image processing, and then the user performs an input to trigger the electronic device to display the remaining first images obtained through image processing.

Figure 3A:
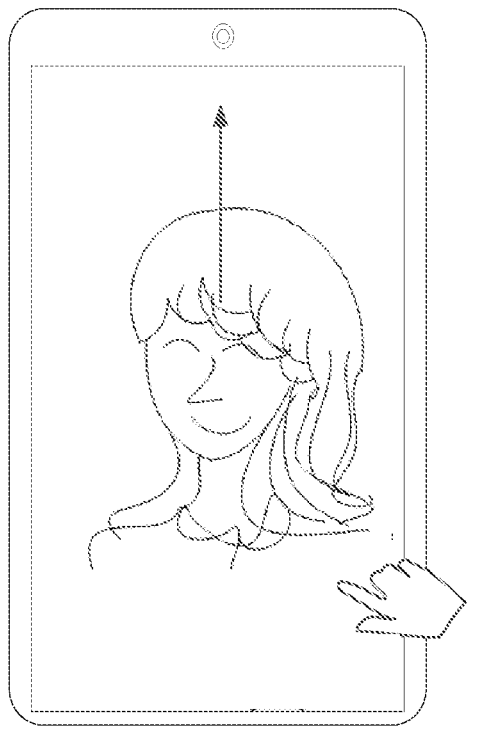
FIG. 3A is a schematic diagram 3 of an example of an interface of a mobile phone according to an embodiment of this application.
Figure 3B:
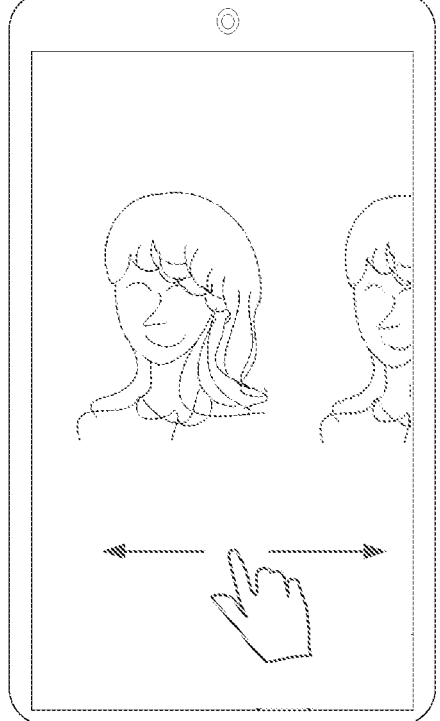
FIG. 3B is a schematic diagram 4 of an example of an interface of a mobile phone according to an embodiment of this application.

For example, as shown in FIG. 3A, the electronic device displays an image obtained through image processing. As shown in FIG. 3B, the user performs a left/right sliding input, to trigger the electronic device to display the remaining images obtained through image processing.

Embodiments of this application provide an image processing method. The user performs the photographing input, to trigger the electronic device to perform photographing through the first application (for example, a camera application) to obtain a plurality of images, and save the image processing parameters set by the user in the first application into the second application (for example, a gallery application). In this case, the electronic device can perform image processing on the plurality of images based on the image processing parameters through the second application. In this solution, the user performs the photographing input, to trigger the electronic device to acquire a plurality of images through the first application, and automatically process the plurality of images through the second application by using preset image processing parameters, without subsequent operations of manually edit the images, thereby improving the efficiency of the electronic device in photographing images.

Optionally, in an implementation of this embodiment of this application, before the foregoing step 201, the image processing method provided in this embodiment of this application further includes the following steps 301 to 304.

Step 301: The electronic device receives a first input by the user when a photographing preview interface of the first application is displayed.

In this embodiment of this application, the photographing preview interface includes at least one control, each control corresponds to an image processing function, and the first input is an input by the user for a first control in the at least one control.

Optionally, in this embodiment of this application, the foregoing photographing preview interface may be a photographing preview interface of the camera application in the electronic device.

Optionally, in this embodiment of this application, the user may perform an input on an application icon of the camera application, or any other identifier that indicates the entrance of the camera application, to trigger the electronic device to display the foregoing photographing preview interface. The details can be determined according to actual usage requirements, and are not limited in embodiments of this application.

Optionally, in this embodiment of this application, the first input may be an input in any possible form such as a click input, a long-press input, a drag input, or a sliding input. The details can be determined according to actual usage requirements, and are not limited in embodiments of this application.

Optionally, in this embodiment of this application, the foregoing at least one control may include a beauty control, a style control, a blur control, a filter control, a border control, a sticker control, and the like. The foregoing image processing function may be a beauty function, a style function, a filter function, a blur function, a border function, a sticker function, and the like. The beauty control corresponds to the beauty function, the style control corresponds to the style function, the blur control corresponds to the blur function, the filter control corresponds to the filter function, the border control corresponds to the border function, and the sticker control corresponds to the sticker function.

Figure 4:
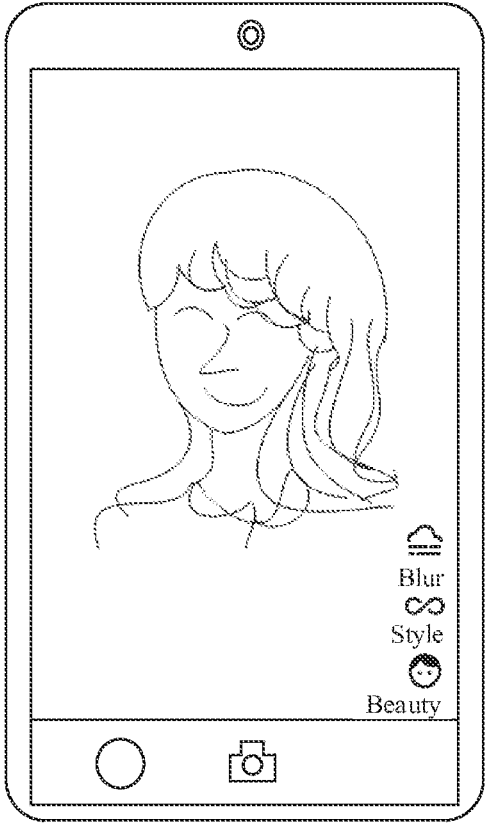
FIG. 4 is a schematic diagram 5 of an example of an interface of a mobile phone according to an embodiment of this application.

For example, as shown in FIG. 4, the photographing preview interface includes a "blur" control, a "style" control, and a "beauty" control, where the "blur" control corresponds to the blur function and the "style" control corresponds to the style function, and the "beauty" control corresponds to the beauty function.

Step 302: The electronic device displays, in response to the first input, identifiers of a plurality of image parameters corresponding to a first image processing function.

In this embodiment of this application, the foregoing first image processing function is an image processing function corresponding to the first control.

Optionally, in this embodiment of this application, each image processing function corresponds to at least one image parameter. For example, the beauty function corresponds to image parameters such as skin resurfacing, whitening, and eye enlarging, and the style function corresponds to image parameters such as natural, retro, and French.

Figure 5:
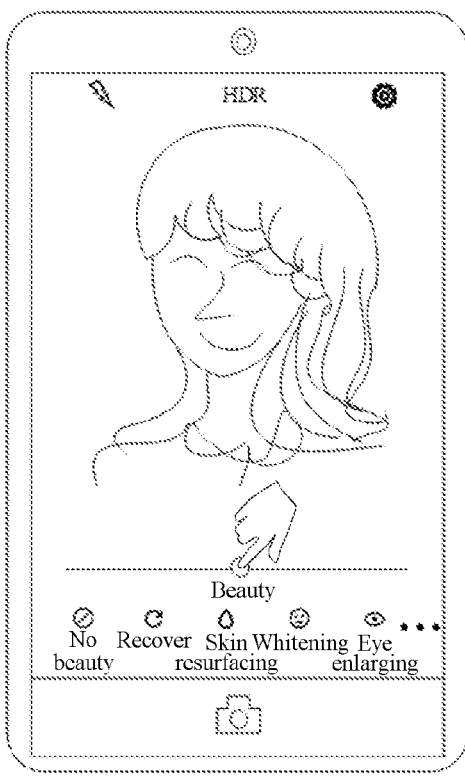
FIG. 5 is a schematic diagram 6 of an example of an interface of a mobile phone according to an embodiment of this application.

For example, with reference to FIG. 4, as shown in FIG. 5, the user performs an input on the "beauty" control, causing the electronic device to display the "no beauty" identifier, the "skin resurfacing" identifier, the "whitening" identifier, the "eye enlarging" identifier, and the like corresponding to the beauty function.

Figure 6:
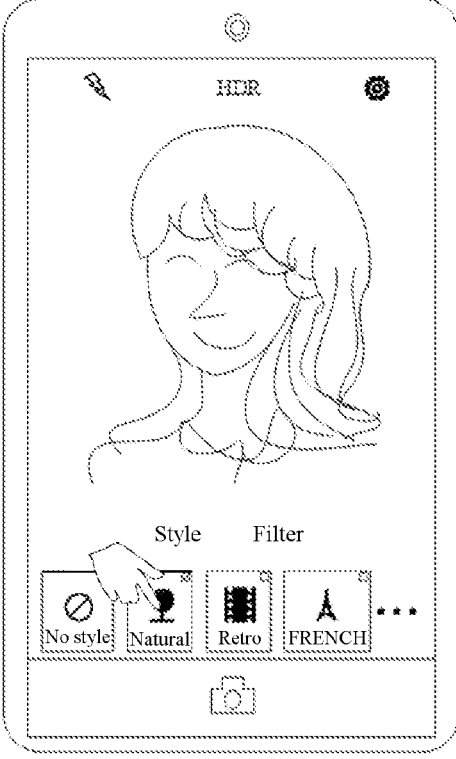
FIG. 6 is a schematic diagram 7 of an example of an interface of a mobile phone according to an embodiment of this application.

In another example, with reference to FIG. 4, as shown in FIG. 6, the user performs an input on the "style" control, causing the electronic device to display the "no style" identifier, the "natural" identifier, the "retro" identifier, the "French" identifier, and the like corresponding to the style function.

Step 303: The electronic device receives a second input by the user for a first identifier.

In this embodiment of this application, the second input is used for determining an image parameter corresponding to the first identifier, and the first identifier is an identifier in the identifiers of the plurality of image parameters.

Optionally, in this embodiment of this application, the second input may be an input in any possible form such as a click input, a long-press input, a drag input, or a sliding input. The details can be determined according to actual usage requirements, and are not limited in embodiments of this application.

Optionally, in this embodiment of this application, the user may trigger, through the second input, the electronic device to determine an image parameter corresponding to the first identifier.

For example, with reference to FIG. 5, when the electronic device displays the "no beauty" identifier, the "skin resurfacing" identifier, the "whitening" identifier, and the "eye enlarging" identifier corresponding to the beauty function, the user may perform an input on the "skin resurfacing" identifier, so that the electronic device displays a sliding bar and a sliding block on the photographing preview interface. The user may then perform an input on the sliding block to adjust a position of the sliding block on the sliding bar, so that the electronic device can determine a "skin resurfacing" parameter corresponding to the "skin resurfacing" identifier.

Step 304: The electronic device determines, in response to the second input, the image parameter corresponding to the first identifier as the target image parameter.

Optionally, in this embodiment of this application, the user may perform an input on an identifier of one image parameter to determine the image parameter as the target image parameter; or the user may perform an input on identifiers of a plurality of image parameters respectively to determine the plurality of image parameters as target image parameters.

For example, the user may perform an input on the "skin resurfacing" identifier to determine an image parameter corresponding to the "skin resurfacing" identifier as the target image parameter; or the user may perform an input on the "skin resurfacing" identifier and the "whitening" identifier, to determine an image parameter corresponding to the "skin resurfacing" identifier and an image parameter corresponding to the "whitening" identifier as target image parameters.

In some embodiments, with reference to FIG. 5, the user may perform an input on the "skin resurfacing" identifier, triggering the electronic device to display an adjustment control in the photographing preview interface, and then the user performs an input on the adjustment control, so that the electronic device determines an image parameter obtained through adjustment as the target image parameter.

Optionally, in this embodiment of this application, the user may choose to set beauty parameters, style parameters, blur parameters, and the like according to own preferences, so that the electronic device finally presents photos that the user is satisfied with.

In this embodiment of this application, the user may preset a set of image processing parameters for a plurality of images in the photographing preview interface of the first application. In this way, when the user performs the photographing input, the electronic device may acquire a plurality of images through the first application, and automatically perform image processing on the plurality of images through the second application by using the set of image processing parameters without subsequent operations of manually edit the images, to obtain a plurality of photos of consecutive moments with the same processing effect, thereby improving the efficiency of the electronic device in photographing images.

Optionally, in another implementation of this embodiment of this application, before the foregoing step 201, the image processing method provided in this embodiment of this application further includes the following steps 401 and 402. Moreover, the foregoing step 203 may be implemented through the following step 203a.

Step 401: The electronic device receives a third input by the user when a continuous photographing preview interface of the first application is displayed.

In this embodiment of this application, the continuous photographing preview interface includes at least two second identifiers, each second identifier indicates an image in a continuous photographing mode, the third input is an input by the user for M identifiers in the at least two second identifiers sequentially, and M is a positive integer.

It should be noted that the foregoing continuous photographing preview interface may be understood as a photographing preview interface in a continuous photographing mode.

Optionally, in this embodiment of this application, the foregoing third input may be an input by the user for some identifiers in at least two second identifiers; or the foregoing third input may be an input by the user for all identifiers in the at least two second identifiers.

Optionally, in this embodiment of this application, before performing the third input, the user may perform an input on a specific setting control in the continuous photographing preview interface, so that the electronic device displays at least two first identifiers.

Figure 7:
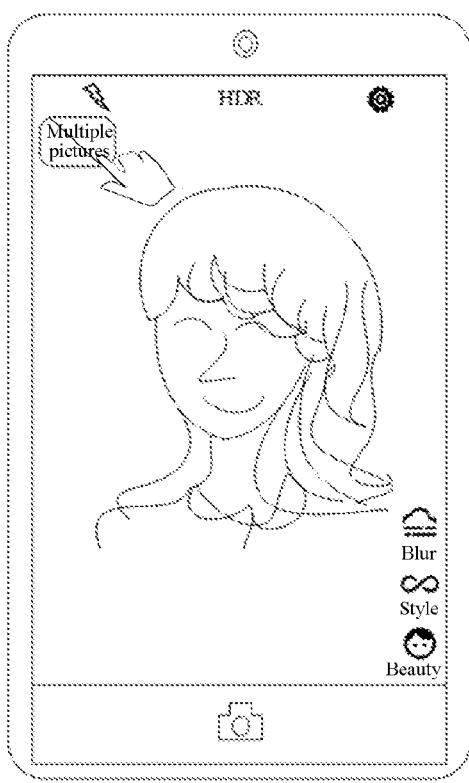
FIG. 7 is a schematic diagram 8 of an example of an interface of a mobile phone according to an embodiment of this application.

For example, as shown in FIG. 7, when the continuous photographing preview interface of the camera application is displayed, the user may perform an input on the "plurality of" controls in the photographing preview interface to trigger the electronic device to display a plurality of serial numbers (that is, at least two first identifiers), and at the same time, the slash on the "plurality of" controls disappears to remind the user that the function of setting image parameters for each image separately has been turned on.

Optionally, in this embodiment of this application, the foregoing at least two second identifiers may be serial numbers/numbers of a plurality of images in the continuous photographing mode, that is, each second identifier indicates which image in the continuous photographing mode. Further, the foregoing at least two second identifiers may be identifiers preset by the user (including the form and quantity of the identifiers), or may be default identifiers in the first application of the electronic device.

Optionally, in this embodiment of this application, in the continuous photographing mode, the electronic device may photograph up to 20 images by default. It can be understood that after the user performs an input on a specific setting control, the electronic device may display 20 identifiers.

Optionally, in this embodiment of this application, the electronic device may display only some identifiers in the at least two second identifiers, and then the user performs an input, triggering the electronic device to display the remaining identifiers of the at least two second identifiers, so that the user may select a specific identifier, to set image parameters for the image indicated by the identifier.

Step 402: The electronic device sequentially sets, in response to the third input, an image parameter for M second images respectively to obtain the target image parameter.

In this embodiment of this application, the M second images are images indicated by M identifiers.

Optionally, in this embodiment of this application, the user may perform the third input on some identifiers in the at least two second identifiers, so that the electronic device sets an image parameter respectively for the images indicated by the identifiers, to obtain the target image parameters. Alternatively, the user may perform the third input on all the identifiers in the at least two second identifiers, so that the electronic device sets an image parameter respectively for the images indicated by all the identifiers to obtain the target image parameters.

Optionally, in this embodiment of this application, the user may perform the third input on a specific identifier, so that the electronic device displays a plurality of controls (where each control corresponds to an image processing function) in an area corresponding to the identifier, so that the user can perform an input on the plurality of controls to set image parameters for the image indicated by the identifier.

Figure 8:
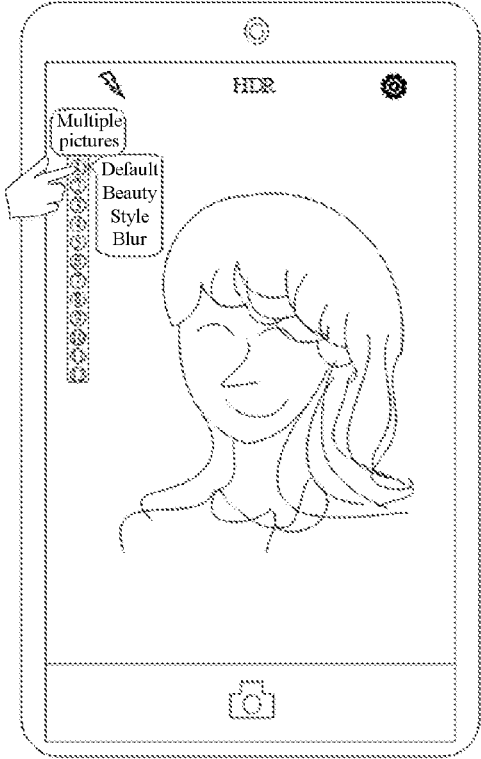
FIG. 8 is a schematic diagram 9 of an example of an interface of a mobile phone according to an embodiment of this application.

For example, as shown in FIG. 8, the user performs the third input on an identifier "①", causing the electronic device to display the "beauty" control, the "style" control, the "blur" control, and the like in the right area of the identifier "①", so that the user may perform an input on the controls to set image parameters for the image indicated by the identifier "①".

It should be noted that for the method of setting image parameters, refer to the relevant descriptions of steps 301 to 304 in the foregoing embodiments. Details are not described herein again to avoid repetition.

Step 203a: The electronic device sequentially performs image processing on each first image respectively by using the image parameter of each second image through the second application.

It should be noted that the second image is substantially different from the first image. The second image is an image indicated by each second identifier in the continuous photographing mode, and the first image is an image actually acquired in the continuous photographing mode.

Optionally, in this embodiment of this application, an image parameter of a second image corresponds to a first image. For each first image in the at least one first image, the electronic device uses an image parameter of the second image to process the first image respectively.

For example, assuming that the image parameters of the M second images are image parameter 1, image parameter 2, and image parameter 3 respectively, and the first images obtained by the electronic device through continuous photographing are image 1, image 2, and image 3 respectively, the electronic device may perform image processing on image 1 by using image parameter 1, perform image processing on image 2 by using image parameter 2, and perform image processing on image 3 by using image parameter 3 through the second application.

In this embodiment of this application, the user may preset a set of image processing parameters for a plurality of images in the photographing preview interface of the first application. In this way, when the user performs the photographing input, the electronic device may acquire a plurality of images through the first application, and automatically perform image processing on each image through the second application by using corresponding image processing parameters without subsequent operations of manually edit the images, to obtain a plurality of photos of consecutive moments with different processing effects, thereby improving the efficiency and flexibility of the electronic device in photographing images.

Optionally, in this embodiment of this application, the third input includes M first sub-inputs, and each first sub-input is an input by the user for one identifier in the M identifiers. The foregoing step 402 may be implemented through the following steps 402a to 402c.

Step 402a: For each identifier in the M identifiers, the electronic device displays N third identifiers or at least one control in response to a first sub-input in M first sub-inputs.

In this embodiment of this application, the N third identifiers are identifiers other than an identifier of a third image in the at least two second identifiers, the identifier of the third image is an identifier corresponding to the first sub-input, each control corresponds to an image processing function, and N is a positive integer.

In this embodiment of this application, for each identifier in the M identifiers, in an implementation, after receiving the first sub-input by the user, the electronic device may directly display an identifier other than the identifier in the at least two second identifiers in an arca corresponding to the identifier. In another implementation, after receiving the first sub-input by the user, the electronic device may display at least one control in the area corresponding to the identifier.

For example, with reference to FIG. 8, after the user performs the first sub-input on the identifier "①", the electronic device may display a "default" control, the "beauty" control, the "style" control, and the "blur" control (namely, at least one control) in the right area of the identifier "①".

Step 402b: The electronic device receives a fourth input by the user.

In this embodiment of this application, the fourth input is an input by the user for a fourth identifier in the N third identifiers, or an input by the user for a second control in the at least one control.

Step 402c: The electronic device sets, in response to the fourth input, an image parameter of the third image to be the same as an image parameter of an image indicated by the fourth identifier, or determines an image parameter of the third image based on an image processing function corresponding to the second control, to obtain the target image parameter.

Optionally, in this embodiment of this application, in a first implementation, for each identifier in the M identifiers, when the electronic device displays N third identifiers, the user may directly perform a fourth input on a specific identifier (namely, the fourth identifier) in the N third identifiers, to set an image parameter of an image indicated by the identifier to be the same as an image parameter of an image indicated by the fourth identifier. In a second implementation, for each identifier in the M identifiers, when the electronic device displays at least one control, the user may perform the fourth input on a specific control (namely, the second control) in the at least one control, to determine an image parameter of the image indicated by the identifier based on an image processing function corresponding to the second control.

In the foregoing second implementation, for each identifier in the M identifiers, after the user performs the fourth input on the second control, the electronic device may display an identifier other than the identifier (for example, identifier 1) in the at least two second identifiers in the area corresponding to the second control, and then the user may perform an input on a specific identifier (for example, identifier 2) in the identifiers, to set an image parameter of an image indicated by identifier 1 to be the same as an image parameter of an image indicated by identifier 2.

Figure 9:
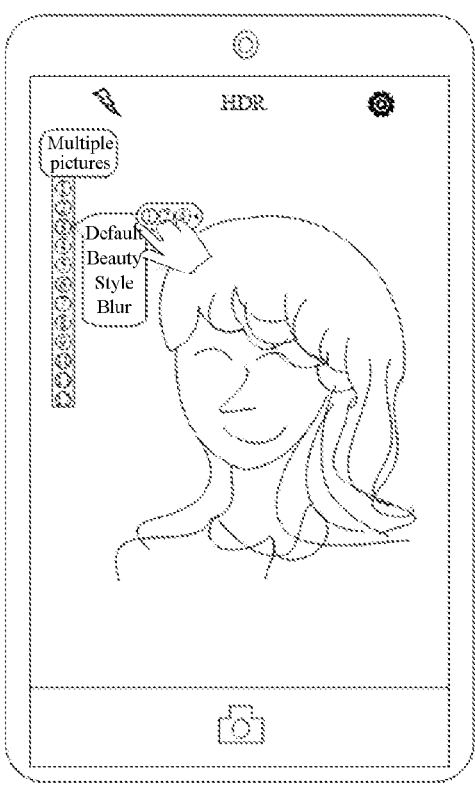
FIG. 9 is a schematic diagram 10 of an example of an interface of a mobile phone according to an embodiment of this application.
Figure 10:
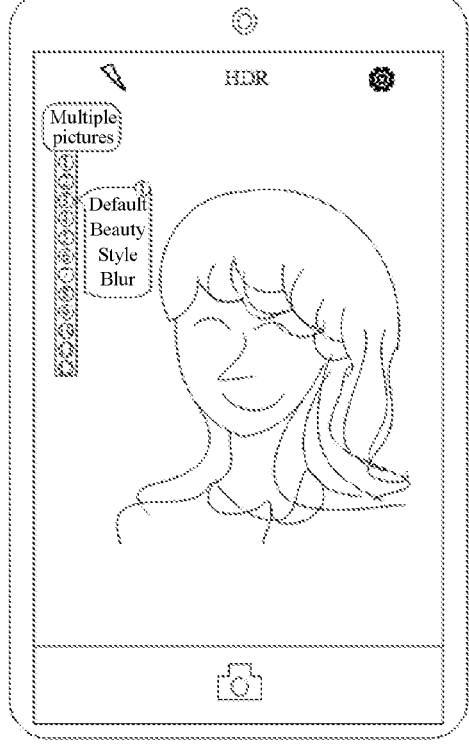
FIG. 10 is a schematic diagram 11 of an example of an interface of a mobile phone according to an embodiment of this application.

For example, as shown in FIG. 9 and FIG. 10, the user may perform the fourth input on the "default" control (namely, the second control), so that the electronic device displays the identifier "①", the identifier "2", and the identifier "④" in the right area of the "default" control, and then the user performs an input on the identifier "①" in the right area of the "default" control, causing the electronic device to set the image parameter of the image indicated by the identifier "③" to be the same as the image parameter of the image indicated by the identifier "①", and display the identifier "①" in the upper right corner of the "default" control.

It should be noted that the foregoing steps 402a to 402c use an identifier to describe the image parameter of the image indicated by the identifier. For each identifier in the M identifiers, the electronic device may use the method in the foregoing steps 402a to 402c to determine an image parameter of an image indicated by each identifier.

In this embodiment of this application, the user may set an image parameter of an image to be the same as an image parameter of one or more images without the user having to reset the image parameter for the image, thereby simplifying user operations and thus improving the efficiency of the electronic device in photographing images.

Optionally, in this embodiment of this application, the foregoing step 302 may be implemented through the following step 302a.

Step 302a: The electronic device performs, in response to the photographing input, continuous photographing through the first application, to obtain at least two first images; and saves, for each second image in the M second images each time a second image is photographed, an image parameter of the second image into the second application, to save the image parameters of the M second images into the second application.

It can be understood that the user may preset image parameters of the M second images, and each time the electronic device photographs a second image, the electronic device saves an image parameter of the second image into the second application. In this way, after the M second images are photographed, the electronic device may save the image parameters of the M second images into the second application.

Optionally, in this embodiment of this application, each time the electronic device saves an image parameter of a second image, the electronic device may use the image parameter to process the second image.

Optionally, in this embodiment of this application, the electronic device may photograph and process images in an order in which the electronic device defaults (that is, an order in which the at least one first identifier is arranged), or in an order set by the user.

In this embodiment of this application, each time the electronic device photographs an image, the electronic device saves an image parameter of the image. In this way, the electronic device can quickly use the image parameter to perform image processing on the image without waiting for all images to be photographed, thereby reducing image processing time in the photographing process, and improving the efficiency of the electronic device in photographing images.

Optionally, in this embodiment of this application, before the foregoing step 201, the image processing method provided in this embodiment of this application further includes the following steps 501 to 504.

Step 501: The electronic device receives a fifth input by the user when a continuous photographing preview interface of the first application is displayed.

In this embodiment of this application, the continuous photographing preview interface includes at least two fifth identifiers, each fifth identifier indicates an image in a continuous photographing mode, the fifth input is an input by the user for P identifiers in the at least two fifth identifiers sequentially, and P is a positive integer.

It should be noted that for descriptions of the continuous photographing preview interface, the fifth input, the at least two fifth identifiers, and the like, refer to the relevant descriptions in the foregoing embodiments. Details are not described herein again.

Step 502: The electronic device sequentially sets, in response to the fifth input, an image parameter for P fourth images respectively.

In this embodiment of this application, the P fourth images are images indicated by P identifiers.

It should be noted that for descriptions of the P fourth images and setting of image parameters, and the like, refer to the relevant descriptions in the foregoing embodiments. Details are not described herein again.

In this embodiment of this application, the fourth image is substantially the same as the second image and substantially different from the first image. The fourth image is an image indicated by each fifth identifier in the continuous photographing mode, and the first image is an image actually acquired in the continuous photographing mode.

Step 503: Receive a sixth input by the user for a sixth identifier in the at least two fifth identifiers.

Step 504: Determine, in response to the sixth input, an image parameter of an image indicated by the sixth identifier as the target image parameter.

Optionally, in this embodiment of this application, before the electronic device performs photographing through the first application, the user may select image parameters that meet own needs, so that after photographing, the electronic device performs image processing on an acquired image by using the image parameters through the second application. In some embodiments, the user may select a specific identifier, to use an image parameter of an image indicated by the identifier as an image parameter used in image processing.

Optionally, in this embodiment of this application, the user may select an identifier before photographing each image, so that the electronic device performs image processing on the image acquired through photographing by using an image parameter of an image indicated by the identifier during image processing. Assuming that the user selects the identifier "①" before photographing for the first time, the electronic device may use the image parameters of the image indicated by the identifier "①" to perform image processing on the image acquired through photographing. The user may alternatively select any other identifier before photographing for the second time. Whichever identifier is selected, image processing is performed on a photo photographed by using an image parameter of an image indicated by the identifier.

It should be noted that in the method in step 401 and step 402, the electronic device needs to perform photographing in an order of image parameters of each identifier set by the user and process the image acquired through photographing. Assuming that the user sets image parameters of images indicated by 20 identifiers, the 20 images acquired by the electronic device through photographing are processed one-to-one in an order of the image parameters of the images indicated by 1 to 20 identifiers. Different from the method in steps 401 and 402, in this embodiment of this application, when the electronic device performs photographing, it is not necessarily necessary to perform photographing and process the image acquired through photographing in the order of the image parameters of each identifier set by the user. Before each photographing, the user may select a specific identifier with set image parameters according to own needs, so that the electronic device uses the image parameters of the image indicated by the identifier to perform image processing on the image acquired through photographing during image processing.

In this embodiment of this application, the user may select a specific identifier with set image parameters before photographing each image, so that the electronic device performs image processing on the image acquired through photographing by using image parameters of an image indicated by the identifier during image processing without subsequent operations of manually editing images, to obtain photos that meet needs of the user, thereby improving the efficiency of the electronic device in photographing images, and improving photographing experience for the user.

It should be noted that, for the image processing method provided in embodiments of this application, the execution body may be an image processing apparatus, or a control module in the image processing apparatus for executing the image processing method. In this embodiment of this application, the image processing apparatus provided in embodiments of this application is described by taking the image processing method performed by the image processing apparatus as an example.

Figure 11:
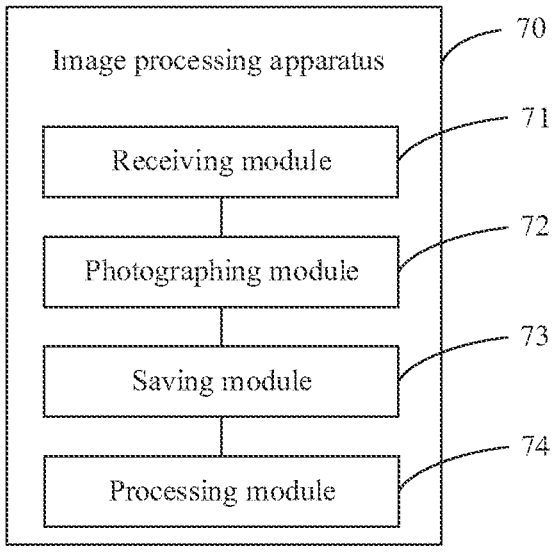
FIG. 11 is a schematic diagram of a structure of an image processing apparatus according to an embodiment of this application.

FIG. 11 is a possible schematic structural diagram of an image processing apparatus according to an embodiment of this application. As shown in FIG. 11, the image processing apparatus 70 may include: a receiving module 71, a photographing module 72, a saving module 73, and a processing module 74.

The receiving module 71 is configured to receive a photographing input by a user. The photographing module 72 is configured to perform, in response to the photographing input received by the receiving module 71, photographing through a first application, to obtain at least one first image. The saving module 73 is configured to save a target image parameter into a second application, where the target image parameter is an image processing parameter set by the user in the first application for the at least one first image. The processing module 74 is configured to perform, through the second application based on the target image parameter saved by the saving module 73, image processing on the at least one first image obtained by the photographing module 72.

This embodiment of this application provides an image processing apparatus. The user performs the photographing input, to acquire a plurality of images through the first application, and automatically process the plurality of images through the second application by using preset image processing parameters, without subsequent operations of manually edit the images, thereby improving the efficiency of photographing images.

In a possible implementation, the image processing apparatus 70 further includes: a display module and a determining module. The receiving module 71 is further configured to receive, before receiving the photographing input by the user, a first input by the user when a photographing preview interface of the first application is displayed, where the photographing preview interface includes at least one control, each control corresponds to an image processing function, and the first input is an input by the user for a first control in the at least one control. The display module is configured to display, in response to the first input received by the receiving module 71, identifiers of a plurality of image parameters corresponding to a first image processing function, where the first image processing function is an image processing function corresponding to the first control. The receiving module 71 is further configured to receive a second input by the user for a first identifier, where the second input is used for determining an image parameter corresponding to the first identifier, and the first identifier is an identifier in the identifiers of the plurality of image parameters. The determining module is configured to determine, in response to the second input received by the receiving module 71, the image parameter corresponding to the first identifier as the target image parameter.

In a possible implementation, the image processing apparatus 70 further includes a setting module. The receiving module 71 is further configured to receive, before receiving the photographing input by the user, a third input by the user when a continuous photographing preview interface of the first application is displayed, where the continuous photographing preview interface includes at least two second identifiers, each second identifier indicates an image in a continuous photographing mode, the third input is an input by the user for M identifiers in the at least two second identifiers sequentially, and M is a positive integer. The setting module is configured to sequentially set, in response to the third input received by the receiving module 71, an image parameter for M second images respectively to obtain the target image parameter, where the M second images are images indicated by the M identifiers. The processing module 74 is configured to sequentially perform image processing on each first image respectively by using the image parameter of each second image through the second application.

In a possible implementation, the third input includes M first sub-inputs, and each first sub-input is an input by the user for one identifier in the M identifiers. The image processing apparatus 70 further includes a setting module. For each identifier in the M identifiers, the setting module is configured to: display N third identifiers or at least one control in response to one first sub-input in the M first sub-inputs, where the N third identifiers are identifiers other than an identifier of a third image in the at least two second identifiers, the identifier of the third image is an identifier corresponding to the first sub-input, each control corresponds to an image processing function, and N is a positive integer; receive a fourth input by the user, where the fourth input is an input by the user for a fourth identifier in the N third identifiers, or an input by the user for a second control in the at least one control; and set, in response to the fourth input, an image parameter of the third image to be the same as an image parameter of an image indicated by the fourth identifier, or determine an image parameter of the third image based on an image processing function corresponding to the second control.

In a possible implementation, the saving module 73 is configured to save, for each second image in the M second images each time a second image is photographed, an image parameter of the second image into the second application, to save the image parameters of the M second images into the second application.

In a possible implementation, the image processing apparatus 70 further includes: a setting module and a determining module. The receiving module 71 is further configured to receive, before receiving the photographing input by the user, a fifth input by the user when a continuous photographing preview interface of the first application is displayed, where the continuous photographing preview interface includes at least two fifth identifiers, each fifth identifier indicates an image in a continuous photographing mode, the fifth input is an input by the user for P identifiers in the at least two fifth identifiers sequentially, and P is a positive integer. The setting module is configured to sequentially set, in response to the fifth input received by the receiving module 71, an image parameter for P fourth images respectively, where the P fourth images are images indicated by the P identifiers. The receiving module 71 is further configured to receive a sixth input by the user for a sixth identifier in the at least two fifth identifiers. The determining module is configured to determine, in response to the sixth input received by the receiving module 71, an image parameter of an image indicated by the sixth identifier as the target image parameter.

The image processing apparatus in this embodiment of this application may be an apparatus, or may be a component, an integrated circuit, or a chip in an electronic device. The apparatus may be a mobile electronic device or may be a non-mobile electronic device. For example, the mobile electronic device may be a mobile phone, a tablet computer, a notebook computer, a palm computer, an in-vehicle electronic device, a wearable device, an ultra-mobile personal computer (UMPC), a netbook, or a personal digital assistant (PDA); and the non-mobile electronic device may be a server, a network attached storage (NAS), a personal computer (PC), a television (TV), a teller machine, or an automated machine, which are not specifically limited in embodiments of this application.

The image processing apparatus in this embodiment of this application may be an apparatus having an operating system. The operating system may be an Android operating system, may be an ios operating system, or may be another possible operating system, and is not specifically limited in embodiments of this application.

The image processing apparatus provided in this embodiment of this application can implement the processes implemented in the foregoing method embodiments, and achieve the same technical effects. To avoid repetition, details are not described herein again.

Figure 12:
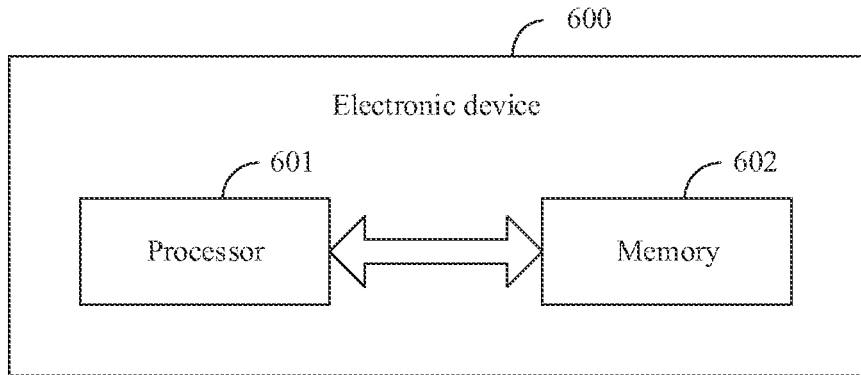
FIG. 12 is a schematic diagram 1 of a hardware structure of an electronic device according to an embodiment of this application.

Optionally, as shown in FIG. 12, an embodiment of this application further provides an electronic device 600, including a processor 601, a memory 602, and a program or instructions stored in the memory 602 and executable on the processor 601, where the program or the instructions, when executed by the processor 601, implement the processes of the embodiments of the foregoing image processing method, and can achieve the same technical effects. To avoid repetition, details are not described herein again.

It should be noted that the electronic device in embodiments of this application includes the foregoing mobile electronic device and non-mobile electronic device.

Figure 13:
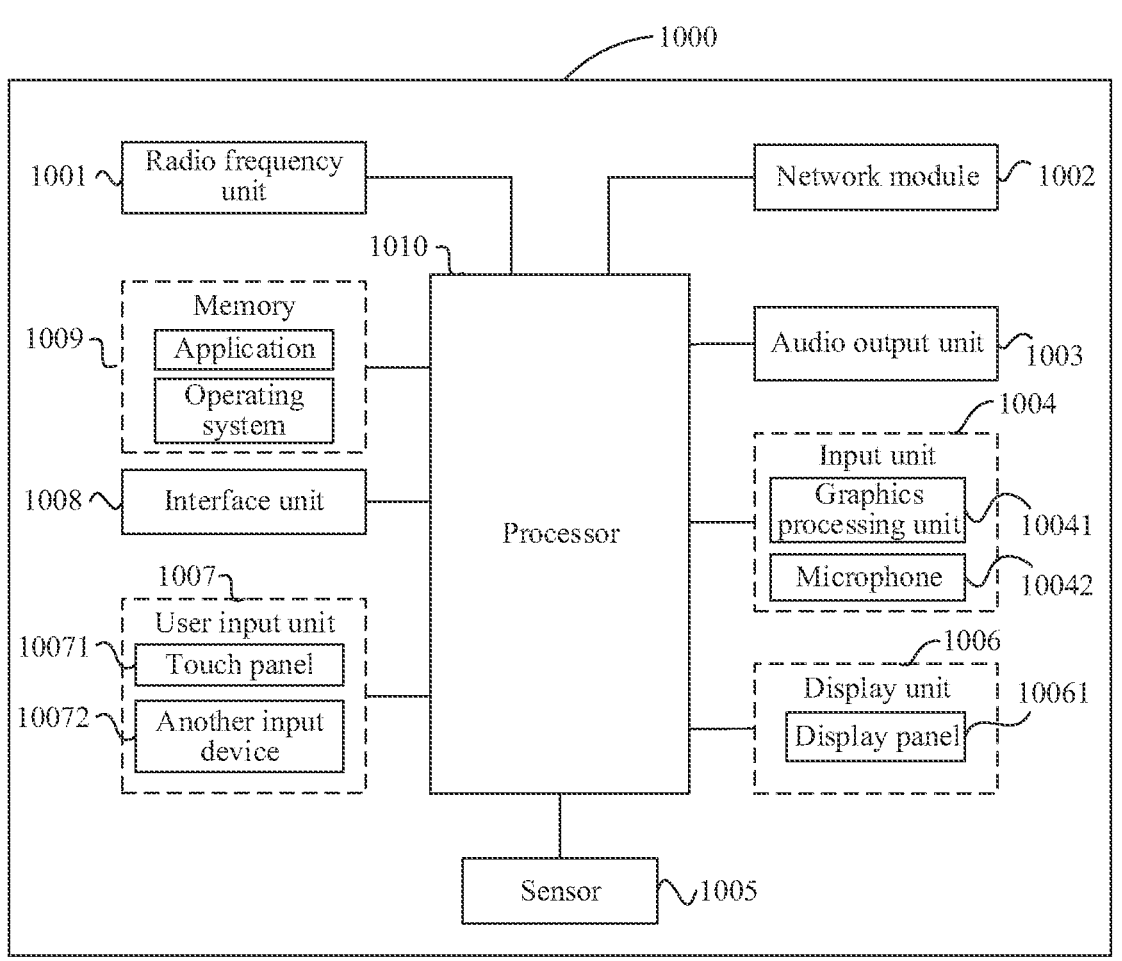
FIG. 13 is a schematic diagram 2 of a hardware structure of an electronic device according to an embodiment of this application.

FIG. 13 is a schematic diagram of a hardware structure of an electronic device according to an embodiment of this application.

The electronic device 1000 includes, but is not limited to, components such as a radio frequency unit 1001, a network module 1002, an audio output unit 1003, an input unit 1004, a sensor 1005, a display unit 1006, a user input unit 1007, an interface unit 1008, a memory 1009, and a processor 1010.

A person skilled in the art may understand that the electronic device 1000 may further include the power supply (for example, a battery) for supplying power to the components. The power supply may be logically connected to the processor 1010 by using a power management system, thereby implementing functions such as charging, discharging, and power consumption management by using the power management system. The electronic device structure shown in FIG. 13 does not constitute a limitation to the electronic device. The electronic device may include more or fewer components than those shown in the figure, or some components may be combined, or a different component deployment may be used. Details are not described herein again.

The user input unit 1007 is configured to receive a photographing input by a user.

The processor 1010 is configured to perform, in response to the photographing input, photographing through a first application, to obtain at least one first image, and save a target image parameter into a second application; and perform image processing on the at least one first image based on the target image parameter through the second application, where the target image parameter is an image processing parameter set by the user in the first application for the at least one first image.

Embodiments of this application provide an electronic device. The user performs the photographing input, to trigger the electronic device to acquire a plurality of images through the first application, and automatically process the plurality of images through the second application by using preset image processing parameters, without subsequent operations of manually edit the images, thereby improving the efficiency of the electronic device in photographing images.

Optionally, in this embodiment of this application, the user input unit 1007 is further configured to receive, before receiving the photographing input by the user, a first input by the user when a photographing preview interface of the first application is displayed, where the photographing preview interface includes at least one control, each control corresponds to an image processing function, and the first input is an input by the user for a first control in the at least one control. The display unit 1006 is configured to display, in response to the first input, identifiers of a plurality of image parameters corresponding to a first image processing function, where the first image processing function is an image processing function corresponding to the first control. The user input unit 1007 is further configured to receive a second input by the user for a first identifier, where the second input is used for determining an image parameter corresponding to the first identifier, and the first identifier is an identifier in the identifiers of the plurality of image parameters. The processor 1010 is further configured to determine, in response to the second input, the image parameter corresponding to the first identifier as the target image parameter.

Optionally, in this embodiment of this application, the user input unit 1007 is further configured to receive, before receiving the photographing input by the user, a third input by the user when a continuous photographing preview interface of the first application is displayed, where the continuous photographing preview interface includes at least two second identifiers, each second identifier indicates an image in a continuous photographing mode, the third input is an input by the user for M identifiers in the at least two second identifiers sequentially, and M is a positive integer. The processor 1010 is further configured to sequentially set, in response to the third input, an image parameter for M second images respectively to obtain the target image parameter, where the M second images are images indicated by the M identifiers. The processor 1010 is configured to sequentially perform image processing on each first image respectively by using the image parameter of each second image through the second application.

Optionally, in this embodiment of this application, the third input includes M first sub-inputs, and each first sub-input is an input by the user for one identifier in the M identifiers. For each identifier in the M identifiers, the display unit 1006 is configured to display N third identifiers or at least one control in response to one first sub-input in the M first sub-inputs, where the N third identifiers are identifiers other than an identifier of a third image in the at least two second identifiers, the identifier of the third image is an identifier corresponding to the first sub-input, each control corresponds to an image processing function, and N is a positive integer. The user input unit 1007 further receives a fourth input by the user, where the fourth input is an input by the user for a fourth identifier in the N third identifiers, or an input by the user for a second control in the at least one control. The processor 1010 is configured to set, in response to the fourth input, an image parameter of the third image to be the same as an image parameter of an image indicated by the fourth identifier, or determine an image parameter of the third image based on an image processing function corresponding to the second control.

Optionally, in this embodiment of this application, the processor 1010 is configured to save, for each second image in the M second images each time a second image is photographed, an image parameter of the second image into the second application, to save the image parameters of the M second images into the second application.

Optionally, in this embodiment of this application, the user input unit 1007 is further configured to receive, before receiving the photographing input by the user, a fifth input by the user when a continuous photographing preview interface of the first application is displayed, where the continuous photographing preview interface includes at least two fifth identifiers, each fifth identifier indicates an image in a continuous photographing mode, the fifth input is an input by the user for P identifiers in the at least two fifth identifiers sequentially, and P is a positive integer. The processor 1010 is further configured to sequentially set, in response to the fifth input, an image parameter for P fourth images respectively, where the P fourth images are images indicated by the P identifiers. The user input unit 1007 is further configured to receive a sixth input by the user for a sixth identifier in the at least two fifth identifiers. The processor 1010 is further configured to determine, in response to the sixth input, an image parameter of an image indicated by the sixth identifier as the target image parameter.

The electronic device provided in embodiments of this application can implement the processes implemented in the foregoing method embodiments, and achieve the same technical effects. To avoid repetition, details are not described herein again.

For details about the beneficial effects of the various implementations in this embodiment, refer to the beneficial effects of the corresponding implementations in the foregoing method embodiments, and details are not described herein again to avoid repetition.

It should be understood that in embodiments of this application, the input unit 1004 may include a graphics processing unit (GPU) 10041 and a microphone 10042, and the graphics processing unit 10041 processes image data of still images or videos obtained by an image capture apparatus (for example, a camera) in a video capture mode or an image capture mode. The display unit 1006 may include a display panel 10061, and the display panel 10061 may be configured in a form such as a liquid crystal display or an organic light-emitting diode. The user input unit 1007 includes a touch panel 10071 and another input device 10072. The touch panel 10071 is also referred to as a touchscreen. The touch panel 10071 may include two parts: a touch detection apparatus and a touch controller, the another input device 10072 may include, but is not limited to, a physical keyboard, a functional key (for example, a volume control key or a switch key), a track ball, a mouse, and a joystick, which are not repeated herein. The memory 1009 may be configured to store a software program and various data, including but not limited to an application and an operating system. The processor 1010 may integrate an application processor and a modem processor. The application processor mainly processes an operating system, a user interface, an application, and the like. The modem processor mainly processes wireless communication. It may be understood that the foregoing modem processor may either not be integrated into the processor 1010.

An embodiment of this application further provides a non-transitory readable storage medium. The non-transitory readable storage medium stores a program or instructions, where the program or the instructions, when executed by a processor, implement the processes of embodiments of the foregoing image processing method, and achieve the same technical effects. To avoid repetition, details are not described herein again.

The processor is the processor in the electronic device described in the foregoing embodiment. The non-transitory readable storage medium includes a non-transitory computer-readable storage medium, and is, for example, a read-only memory (ROM), a random access memory (RAM), a magnetic disk, or an optical disc.

An embodiment of this application further provides a chip, where the chip includes a processor and a communication interface, the communication interface is coupled to the processor, and the processor is configured to run a program or instructions, to implement the processes of embodiments of the foregoing image processing method, and achieve the same technical effects. To avoid repetition, details are not described herein again.

It should be understood that, the chip mentioned in this embodiment of this application may also be referred to as a system-level chip, a system chip, a chip system, a system on chip, or the like.

It should be noted that the term "include", "include" or any other variation thereof in this specification is intended to cover a non-exclusive inclusion, which specifies the presence of stated processes, methods, objects, or apparatuses, but does not preclude the presence or addition of one or more other processes, methods, objects, or apparatuses. Without more limitations, elements defined by the sentence "including one" does not exclude that there are still other same elements in the processes, methods, objects, or apparatuses. Further, it should be noted that the scope of the method and the apparatus in the implementations of this application is not limited to performing the functions in the order shown or discussed, but may further include performing the functions in a substantially simultaneous manner or in the reverse order depending on the functions involved. For example, the described method may be performed in an order different from that described, and various steps may be further added, omitted, or combined. In addition, features described with reference to some examples may be combined in other examples.

Through the descriptions of the foregoing implementations, a person skilled in the art may clearly understand that the methods in the foregoing embodiments may be implemented via software and a necessary general hardware platform, and certainly, may also be implemented by hardware, but in many cases, the former manner is a better implementation. Based on such an understanding, the technical solutions of this application essentially or the part contributing to the prior art may be implemented in a form of a computer software product. The computer software product is stored in a storage medium (for example, a ROM/RAM, a magnetic disk, or an optical disc) and includes several instructions for instructing a terminal (which may be a mobile phone, a computer, a server, a network device, or the like) to perform the method described in embodiments of this application.

Embodiments of this application are described above with reference to the accompanying drawings. However, this application is not limited to the foregoing implementations. The foregoing implementations are illustrative instead of limitative. Enlightened by this application, a person of ordinary skill in the art can make many forms without departing from the idea of this application and the scope of protection of the claims. All of the forms fall within the protection of this application.

What is claimed is:

1. An image processing method, wherein the method comprises:

receiving a photographing input by a user;

performing, in response to the photographing input, photographing through a first application, to obtain at least one first image, and saving a target image parameter into a second application; and performing image processing on the at least one first image based on the target image parameter through the second application; wherein the target image parameter is an image processing parameter set by the user in the first application for the at least one first image;

wherein before the receiving the photographing input by the user, the method further comprises:

receiving a third input by the user when a continuous photographing preview interface of the first application is displayed, wherein the continuous photographing preview interface comprises at least two second identifiers, each second identifier indicates an image in a continuous photographing mode, the third input is an input by the user for M identifiers in the at least two second identifiers sequentially, and M is a positive integer; and sequentially setting, in response to the third input, an image parameter for M second images respectively to obtain the target image parameter, wherein the M second images are images indicated by the M identifiers; and the performing image processing on the at least one first image based on the target image parameter through the second application comprises:

sequentially performing image processing on each first image respectively by using the image parameter of each second image through the second application.

2. The method according to claim 1, wherein before the receiving the photographing input by the user, the method further comprises:

receiving a first input by the user when a photographing preview interface of the first application is displayed, wherein the photographing preview interface comprises at least one control, each control corresponds to an image processing function, and the first input is an input by the user for a first control in the at least one control;

displaying, in response to the first input, identifiers of a plurality of image parameters corresponding to a first image processing function, wherein the first image processing function is an image processing function corresponding to the first control;

receiving a second input by the user for a first identifier, wherein the second input is used for determining an image parameter corresponding to the first identifier, and the first identifier is an identifier in the identifiers of the plurality of image parameters; and determining, in response to the second input, the image parameter corresponding to the first identifier as the target image parameter.

3. The method according to claim 1, wherein the third input comprises M first sub-inputs, and each first sub-input is an input by the user for one identifier in the M identifiers; and the sequentially setting, in response to the third input, the image parameter for the M second images respectively comprises:

for each identifier in the M identifiers:

displaying N third identifiers or at least one control in response to one first sub-input in the M first sub-inputs, wherein the N third identifiers are identifiers other than an identifier of a third image in the at least two second identifiers, the identifier of the third image is an identifier corresponding to the first sub-input, each control corresponds to an image processing function, and N is a positive integer;

receiving a fourth input by the user, wherein the fourth input is an input by the user for a fourth identifier in the N third identifiers, or an input by the user for a second control in the at least one control; and setting, in response to the fourth input, an image parameter of the third image to be the same as an image parameter of an image indicated by the fourth identifier, or determining an image parameter of the third image based on an image processing function corresponding to the second control.

4. The method according to claim 1, wherein the saving the target image parameter into the second application comprises:

saving, for each second image in the M second images each time a second image is photographed, an image parameter of the second image into the second application, to save the image parameters of the M second images into the second application.

5. The method according to claim 1, wherein before the receiving the photographing input by the user, the method further comprises:

receiving a fifth input by the user when a continuous photographing preview interface of the first application is displayed, wherein the continuous photographing preview interface comprises at least two fifth identifiers, each fifth identifier indicates an image in a continuous photographing mode, the fifth input is an input by the user for P identifiers in the at least two fifth identifiers sequentially, and P is a positive integer;

sequentially setting, in response to the fifth input, an image parameter for P fourth images respectively, wherein the P fourth images are images indicated by the P identifiers;

receiving a sixth input by the user for a sixth identifier in the at least two fifth identifiers; and determining, in response to the sixth input, an image parameter of an image indicated by the sixth identifier as the target image parameter.

6. An electronic device, comprising a processor, a memory, and a program or instructions stored in the memory and executable on the processor, the program or the instructions, when executed by the processor, cause the electronic device to perform:

receiving a photographing input by a user;

performing, in response to the photographing input, photographing through a first application, to obtain at least one first image, and saving a target image parameter into a second application; and performing image processing on the at least one first image based on the target image parameter through the second application; wherein the target image parameter is an image processing parameter set by the user in the first application for the at least one first image;

wherein the program or the instructions, when executed by the processor, cause the electronic device to further perform:

receiving a third input by the user when a continuous photographing preview interface of the first application is displayed, wherein the continuous photographing preview interface comprises at least two second identifiers, each second identifier indicates an image in a continuous photographing mode, the third input is an input by the user for M identifiers in the at least two second identifiers sequentially, and M is a positive integer; and sequentially setting, in response to the third input, an image parameter for M second images respectively to obtain the target image parameter, wherein the M second images are images indicated by the M identifiers; and the program or the instructions, when executed by the processor, cause the electronic device to perform:

sequentially performing image processing on each first image respectively by using the image parameter of each second image through the second application.

7. The electronic device according to claim 6, wherein the program or the instructions, when executed by the processor, cause the electronic device to further perform:

receiving a first input by the user when a photographing preview interface of the first application is displayed, wherein the photographing preview interface comprises at least one control, each control corresponds to an image processing function, and the first input is an input by the user for a first control in the at least one control;

displaying, in response to the first input, identifiers of a plurality of image parameters corresponding to a first image processing function, wherein the first image processing function is an image processing function corresponding to the first control;

receiving a second input by the user for a first identifier, wherein the second input is used for determining an image parameter corresponding to the first identifier, and the first identifier is an identifier in the identifiers of the plurality of image parameters; and determining, in response to the second input, the image parameter corresponding to the first identifier as the target image parameter.

8. The electronic device according to claim 6, wherein the third input comprises M first sub-inputs, and each first sub-input is an input by the user for one identifier in the M identifiers; and the program or the instructions, when executed by the processor, cause the electronic device to perform:

for each identifier in the M identifiers:

displaying N third identifiers or at least one control in response to one first sub-input in the M first sub-inputs, wherein the N third identifiers are identifiers other than an identifier of a third image in the at least two second identifiers, the identifier of the third image is an identifier corresponding to the first sub-input, each control corresponds to an image processing function, and N is a positive integer;

receiving a fourth input by the user, wherein the fourth input is an input by the user for a fourth identifier in the N third identifiers, or an input by the user for a second control in the at least one control; and setting, in response to the fourth input, an image parameter of the third image to be the same as an image parameter of an image indicated by the fourth identifier, or determining an image parameter of the third image based on an image processing function corresponding to the second control.

9. The electronic device according to claim 6, wherein the program or the instructions, when executed by the processor, cause the electronic device to perform:

saving, for each second image in the M second images each time a second image is photographed, an image parameter of the second image into the second application, to save the image parameters of the M second images into the second application.

10. The method according to claim 6, wherein the program or the instructions, when executed by the processor, cause the electronic device to further perform:

receiving a fifth input by the user when a continuous photographing preview interface of the first application is displayed, wherein the continuous photographing preview interface comprises at least two fifth identifiers, each fifth identifier indicates an image in a continuous photographing mode, the fifth input is an input by the user for P identifiers in the at least two fifth identifiers sequentially, and P is a positive integer;

sequentially setting, in response to the fifth input, an image parameter for P fourth images respectively, wherein the P fourth images are images indicated by the P identifiers;

receiving a sixth input by the user for a sixth identifier in the at least two fifth identifiers; and determining, in response to the sixth input, an image parameter of an image indicated by the sixth identifier as the target image parameter.

11. A non-transitory readable storage medium, storing a program or instructions, the program or the instructions, when executed by a processor of an electronic device, cause the electronic device to perform:

receiving a photographing input by a user;

performing, in response to the photographing input, photographing through a first application, to obtain at least one first image, and saving a target image parameter into a second application; and performing image processing on the at least one first image based on the target image parameter through the second application; wherein the target image parameter is an image processing parameter set by the user in the first application for the at least one first image;

wherein the program or the instructions, when executed by the processor, cause the electronic device to further perform:

receiving a third input by the user when a continuous photographing preview interface of the first application is displayed, wherein the continuous photographing preview interface comprises at least two second identifiers, each second identifier indicates an image in a continuous photographing mode, the third input is an input by the user for M identifiers in the at least two second identifiers sequentially, and M is a positive integer; and sequentially setting, in response to the third input, an image parameter for M second images respectively to obtain the target image parameter, wherein the M second images are images indicated by the M identifiers; and the program or the instructions, when executed by the processor, cause the electronic device to perform:

sequentially performing image processing on each first image respectively by using the image parameter of each second image through the second application.

12. The non-transitory readable storage medium according to claim 11, wherein the program or the instructions, when executed by the processor, cause the electronic device to further perform:

receiving a first input by the user when a photographing preview interface of the first application is displayed, wherein the photographing preview interface comprises at least one control, each control corresponds to an image processing function, and the first input is an input by the user for a first control in the at least one control;

displaying, in response to the first input, identifiers of a plurality of image parameters corresponding to a first image processing function, wherein the first image processing function is an image processing function corresponding to the first control;

receiving a second input by the user for a first identifier, wherein the second input is used for determining an image parameter corresponding to the first identifier, and the first identifier is an identifier in the identifiers of the plurality of image parameters; and determining, in response to the second input, the image parameter corresponding to the first identifier as the target image parameter.

13. The non-transitory readable storage medium according to claim 11, wherein the third input comprises M first sub-inputs, and each first sub-input is an input by the user for one identifier in the M identifiers; and the program or the instructions, when executed by the processor, cause the electronic device to perform:

for each identifier in the M identifiers:

displaying N third identifiers or at least one control in response to one first sub-input in the M first sub-inputs, wherein the N third identifiers are identifiers other than an identifier of a third image in the at least two second identifiers, the identifier of the third image is an identifier corresponding to the first sub-input, each control corresponds to an image processing function, and N is a positive integer;

receiving a fourth input by the user, wherein the fourth input is an input by the user for a fourth identifier in the N third identifiers, or an input by the user for a second control in the at least one control; and setting, in response to the fourth input, an image parameter of the third image to be the same as an image parameter of an image indicated by the fourth identifier, or determining an image parameter of the third image based on an image processing function corresponding to the second control.

14. The non-transitory readable storage medium according to claim 11, wherein the program or the instructions, when executed by the processor, cause the electronic device to perform:

saving, for each second image in the M second images each time a second image is photographed, an image parameter of the second image into the second application, to save the image parameters of the M second images into the second application.

15. The non-transitory readable storage medium according to claim 11, wherein the program or the instructions, when executed by the processor, cause the electronic device to further perform:

receiving a fifth input by the user when a continuous photographing preview interface of the first application is displayed, wherein the continuous photographing preview interface comprises at least two fifth identifiers, each fifth identifier indicates an image in a continuous photographing mode, the fifth input is an input by the user for P identifiers in the at least two fifth identifiers sequentially, and P is a positive integer;

sequentially setting, in response to the fifth input, an image parameter for P fourth images respectively, wherein the P fourth images are images indicated by the P identifiers;

receiving a sixth input by the user for a sixth identifier in the at least two fifth identifiers; and determining, in response to the sixth input, an image parameter of an image indicated by the sixth identifier as the target image parameter.

16. A chip, wherein the chip comprises a processor and a communication interface, the communication interface is coupled to the processor, and the processor is configured to run a program or instructions to implement the image processing method according to claim 1.

17. A chip, wherein the chip comprises a processor and a communication interface, the communication interface is coupled to the processor, and the processor is configured to run a program or instructions to implement the image processing method according to claim 2.

* * * * *